US009637931B2

(12) United States Patent
Hart et al.

(10) Patent No.: US 9,637,931 B2
(45) Date of Patent: May 2, 2017

(54) CONNECTOR APPARATUS

(71) Applicant: University Health Network, Toronto (CA)

(72) Inventors: Andrew John Hart, Kleinburg (CA);
Geoffrey Roy Fernie, Etobicoke (CA);
T. Daniel Smyth, Aurora (CA);
Victoria P. Komisar, Calgary (CA);
Emily Catherine King, Etobicoke (CA); Peter George Murray, Midland (CA)

(73) Assignee: University Health Network, Toronto, Ontario (CA)

( * ) Notice: Subject to any disclaimer, the term of this patent is extended or adjusted under 35 U.S.C. 154(b) by 655 days.

(21) Appl. No.: 14/067,779

(22) Filed: Oct. 30, 2013

(65) Prior Publication Data

US 2015/0117936 A1    Apr. 30, 2015

(51) Int. Cl.
*F16B 7/04* (2006.01)
*E04F 11/18* (2006.01)

(52) U.S. Cl.
CPC ...... *E04F 11/1817* (2013.01); *E04F 11/1834* (2013.01); *E04F 2011/1819* (2013.01); *Y10T 403/39* (2015.01)

(58) Field of Classification Search
CPC .............. E04F 11/1808; E04F 11/1817; E04F 11/1834; E04F 2011/1819;
(Continued)

(56) References Cited

U.S. PATENT DOCUMENTS 2,001,215 A * 5/1935 Ruppel ............... E04B 1/24
403/157
2,715,513 A * 8/1955 Kools ............... E04F 11/1834
256/21
(Continued)

FOREIGN PATENT DOCUMENTS

FR         2536830 A1     6/1984

OTHER PUBLICATIONS

The Packaging User's Handbook; p. 109; F.A. Paine; 1996.
(Continued)

*Primary Examiner* — Robert Canfield
(74) *Attorney, Agent, or Firm* — Philip C. Mendes da Costa; Bereskin & Parr LLP/S.E.N.C.R.L., s.r.l.

(57) ABSTRACT

A connector apparatus has a first portion and a second portion. The first portion mounts to an upright that has knobby hand grip protrusions. The second portion provides a connection for a laterally extending cross-member. The first portion interacts with the knobby hand grip protrusions to have a combination of a first degree of freedom permitting motion in one direction, while inhibiting motion in a second degree of freedom. The second portion has a releasable connection to the cross-member, and when engaged, has a degree of freedom of motion about an axis of the second portion cross-wise to the axis of the upright. The second portion has a releasable, retained, pin connector with a quarter-turn lock to prevent accidental disengagement. The connection of the second portion is offset such that when two connectors are seated back-to-back their cross-tie connections stand in substantially the same horizontal plane relative to the ground.

22 Claims, 14 Drawing Sheets

(58) Field of Classification Search
CPC ...... E04F 2011/1821; E04F 2011/1827; A47K 17/022; A47K 17/024; Y10T 403/587; Y10T 403/7178; Y10T 403/7182; Y10T 403/7188; Y10T 403/7176; Y10T 403/32861; Y10T 403/62918; E04B 1/1903; E04B 2001/1921; E04B 2001/1957; E04B 2001/2406; A47B 57/545; A47B 57/562
USPC ......... 52/655.1; 403/67, 70–73, 78, 79, 154, 403/161, 187; 182/113; 211/187, 190, 211/207; 256/67, 68, 65.02, 65.05; 248/274.1, 276.1, 288.11; 4/571.1
See application file for complete search history.

(56) References Cited

U.S. PATENT DOCUMENTS

| | | | |
|---|---|---|---|
| 3,848,480 A | 11/1974 | Oseroff et al. | |
| 4,498,204 A | 2/1985 | Warner | |
| 4,656,952 A * | 4/1987 | Schweizer | A47B 57/265 108/11 |
| 5,593,143 A * | 1/1997 | Ferrarin | E04H 17/08 248/68.1 |
| 6,044,988 A * | 4/2000 | Yang | A47B 57/265 108/107 |
| 6,068,143 A * | 5/2000 | Wang | A47B 57/265 108/144.11 |
| 6,112,625 A * | 9/2000 | Turtle | B25B 23/0021 81/177.1 |
| 6,505,453 B1 * | 1/2003 | Rixen | E04B 2/766 403/187 |
| 6,695,156 B1 * | 2/2004 | Wang | A47B 57/265 108/147.11 |
| 6,779,782 B1 * | 8/2004 | Webb | E04H 17/1413 256/65.01 |
| 6,854,163 B1 | 2/2005 | Ruana | |
| 6,892,502 B1 * | 5/2005 | Hubbell | E04C 3/08 40/584 |
| 7,040,642 B2 | 5/2006 | Lowry | |
| 7,478,971 B2 * | 1/2009 | Li | A47B 57/545 108/147.13 |
| 7,931,385 B1 | 4/2011 | Smith | |
| 7,934,701 B2 | 5/2011 | Kay | |
| 9,167,915 B1 * | 10/2015 | Lau | A47B 47/0083 |
| 2002/0046982 A1 * | 4/2002 | Guizzardi | A47B 57/545 211/187 |
| 2002/0110406 A1 * | 8/2002 | Coles | F16B 7/185 403/57 |
| 2003/0057020 A1 | 3/2003 | Carder et al. | |
| 2003/0159250 A1 | 8/2003 | Ruana | |
| 2005/0102868 A1 | 5/2005 | Ruana | |
| 2006/0053547 A1 * | 3/2006 | Farrow | A47K 17/024 4/576.1 |
| 2007/0086852 A1 * | 4/2007 | Goad | A47K 17/022 403/292 |
| 2009/0032792 A1 * | 2/2009 | Ford | E04F 11/1834 256/67 |
| 2010/0001246 A1 | 1/2010 | Kay | |
| 2010/0037971 A1 | 2/2010 | Scherer | |
| 2011/0214946 A1 | 9/2011 | Yeh | |
| 2013/0133467 A1 | 5/2013 | Slone | |
| 2014/0134358 A1 | 5/2014 | Hart | |
| 2014/0134359 A1 * | 5/2014 | Hart | A47K 17/022 428/34.1 |
| 2014/0199112 A1 * | 7/2014 | Milner | E04F 11/1834 403/72 |
| 2015/0115119 A1 * | 4/2015 | Hart | A61G 5/14 248/274.1 |

OTHER PUBLICATIONS

Definition of Integral; http://dictionary.reference.com/browse/intergral; retrieved Oct. 29, 2015.
Ebay Oury Grips Mountain Bike Grips Glow-in-the-dark, retrieved from the Internet on Jan. 20, 2012.
Stairglow Emergency Exit Stairwell Products, retrieved from the Internet on Jan. 20, 2012.
Green Glow Stick Handle, retrieved from the Internet on Jan. 20, 2012.
Oury Soft rubber Mountain Bike Grips (17 colors), retrieved from the Internet on Jan. 24, 2012.
GripLink: About us, retrieved from the Internet on Jan. 19, 2012.
GripLink: Common Questions, retrieved from the Internet on Jan. 19, 2012.
GripLink: Workplace Info, retrieved from the Internet on Jan. 19, 2012.

* cited by examiner

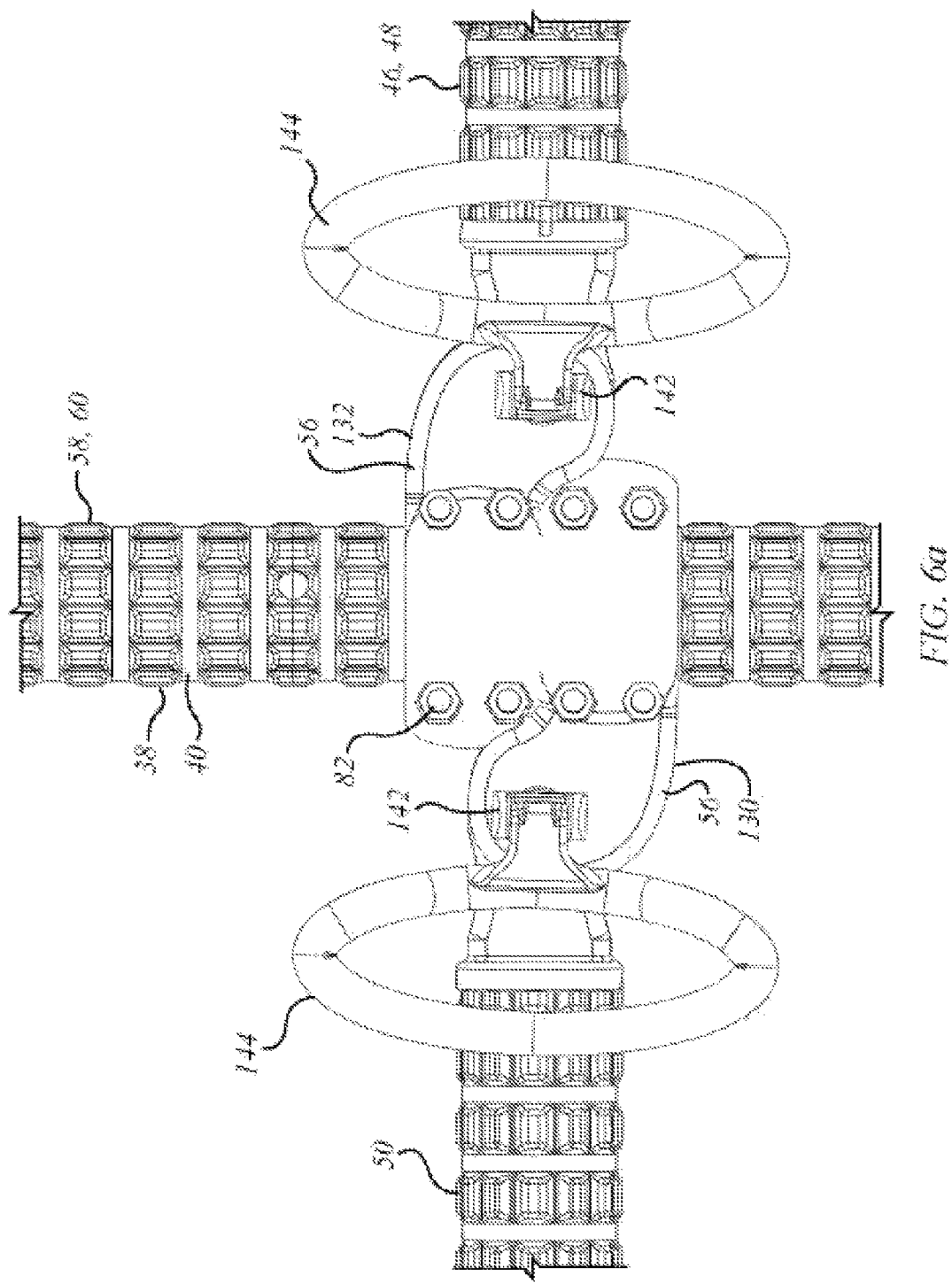

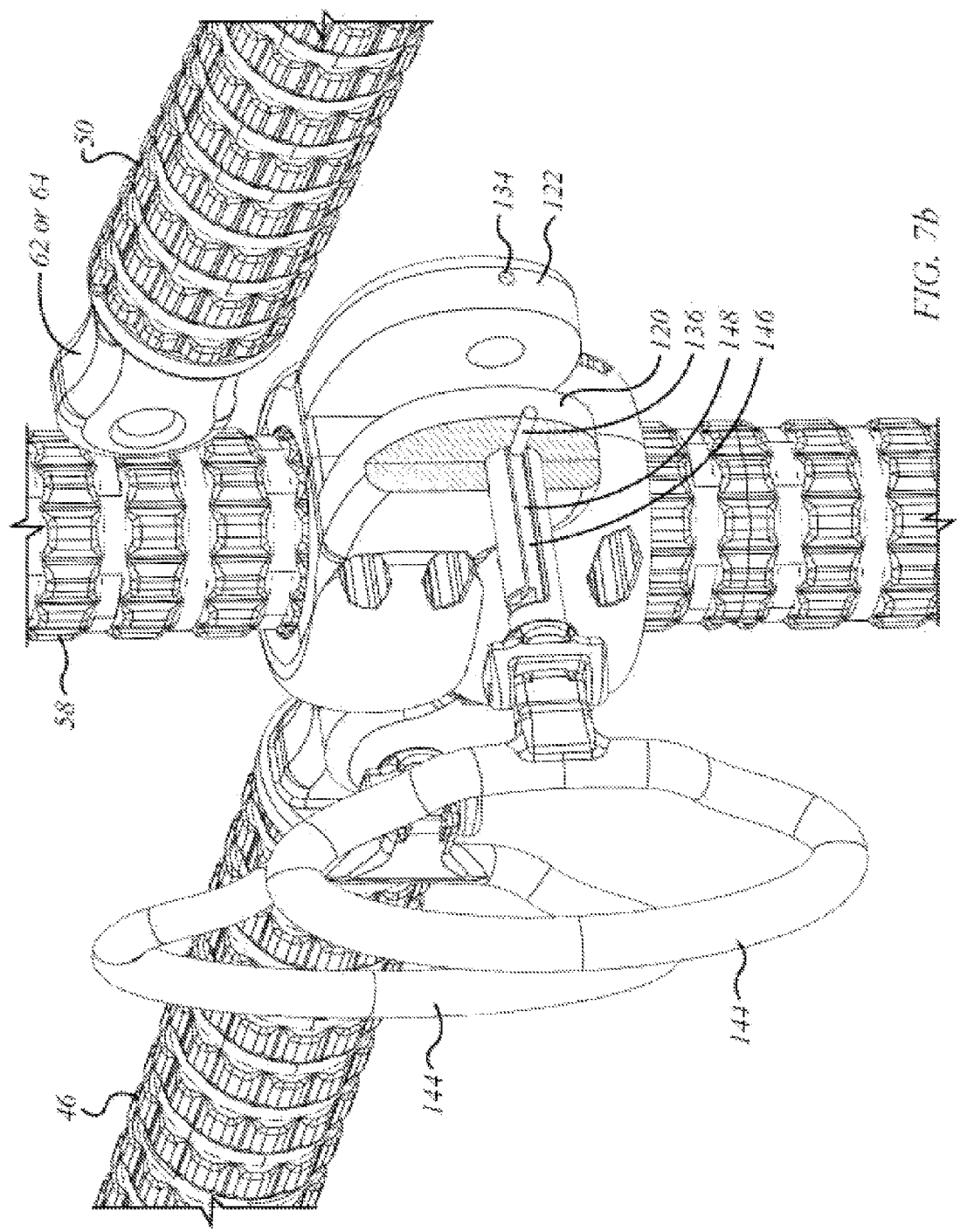

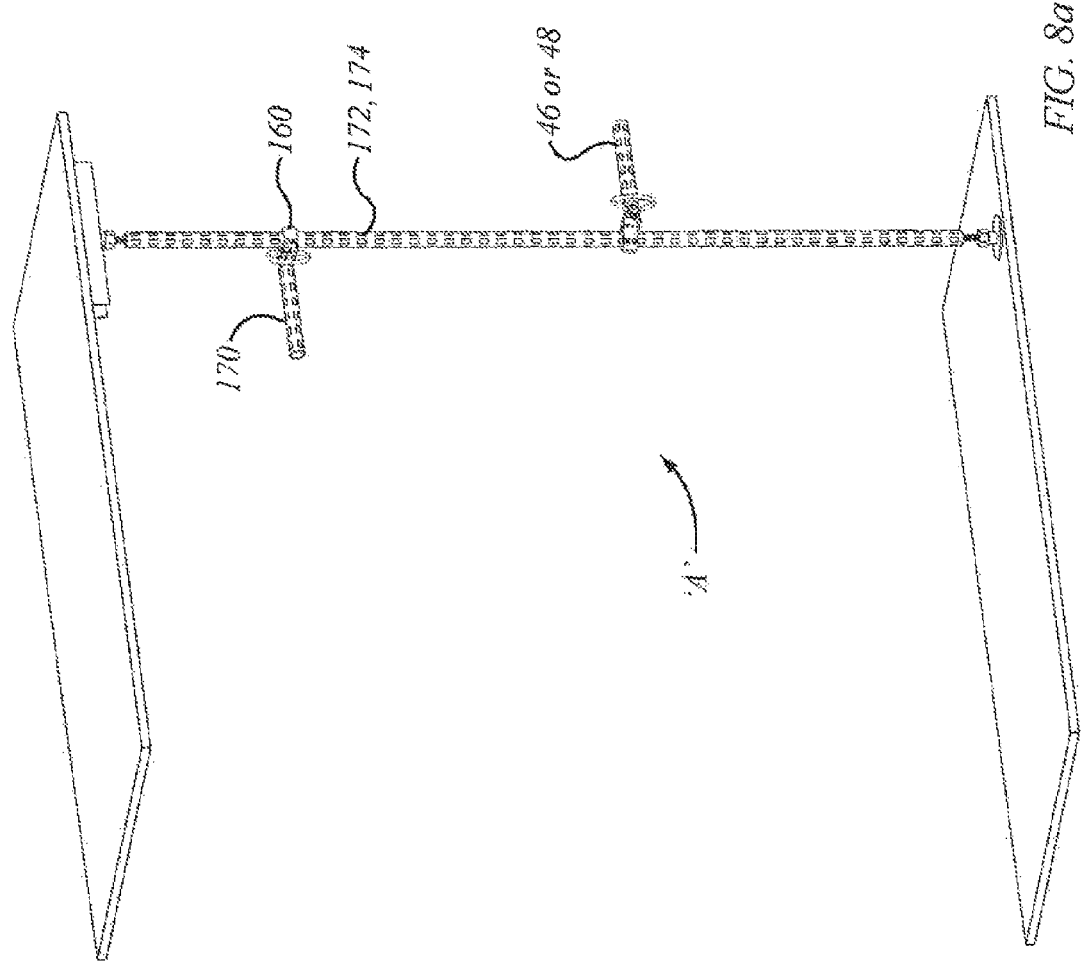

CONNECTOR APPARATUS

FIELD OF INVENTION

This application relates to connector apparatus for arrays of supports.

BACKGROUND OF THE INVENTION

Handrails and support posts of a not necessarily permanent nature may sometimes be used in living facilities of persons whose mobility is impaired or restricted for one reason or another. Those handrails and supports may have hand grips such as may be useful to aid such persons in moving from place to place with the handrails and supports as a guide. Another type of post-and-bar arrangement may be used in the context of exercise, physical therapy, or rehabilitation. An example of such a system is shown in U.S. Pat. No. 5,056,753 of Lunau. In such a support structure it may be desirable or convenient to be able temporarily to move or remove a handrail to provide access to an adjacent space from time to time.

SUMMARY OF INVENTION

The following summary may introduce the reader to the more detailed discussion to follow. The summary is not intended to, and does not, limit or define the claims.

In an aspect of the invention there is a connector apparatus for mating to a pole having a grip surface, that grip surface having axially spaced index elements. The connector apparatus has a body seatable about the pole. The body has an index member for mating engagement with at least one of the index elements of the pole. When so engaged, the body is axially retained along the pole and is circumferentially adjustable about the pole. The body has a cross-tie mount. The cross-tie mount has a rotational degree of freedom about an axis cross-wise to the axial direction of the pole and a securement member, or securement fitting, by which to secure a cross-tie to the cross-tie mount.

In a feature of that aspect of the invention the grip surface has outwardly extending protrusions, and the index member is a radially inwardly protruding member. In another feature, the connector body has abutment elements co-operable with mating features of the index elements of the pole to obstruct motion both upward and downward. In still another feature, the body has a first portion and a second portion, the first portion and the second portion being separable to permit installation on the pole, and securable together on installation. In yet another feature, the cross-tie mount includes one of: (a) a clevis for mating engagement with a tongue of a cross-tie; and (b) a tongue for mating engagement with a clevis of a cross-tie.

In another feature the cross-tie mount includes a clevis and a connector pin co-operable therewith. The connector pin is movable between a release position and a secure position. The cross-tie mount includes a pin retainer operable to prevent escape of the pin. In a further feature, the connector includes a partial turn securement operable to prevent disengagement of the pin when the pin is in the secure position. In still another feature the body of the connector has at least a first end face extending cross-wise to the pole, and the cross-tie mount has an axis of the rotational degree of freedom thereof offset toward the first end face. In another further feature, there is a first connector and a second connector. The second connector is placed in inverted orientation relative to the first connector, and placed adjacent thereto. When so placed, the axes of rotational degrees of freedom of the respective cross-tie mounts of the first and second connectors are offset toward each other at corresponding heights relative to the pole. In a still further feature, the cross-tie mount axes lie in the same plane.

In another aspect of the invention, there is a combination of an upright having a gripping array and a cross-tie member connector. The gripping array has members thereof defining a plurality of indexing members spaced axially therealong. The connector has a body selectively seatable about the upright. The body has an indexing member co-operably engageable with at least one of the plurality of indexing members of the gripping array of the upright. When so co-operably engaged, the connector has one of (a) a first degree of freedom of angular displacement in a circumferential direction about the upright, while being inhibited from displacement in a second degree of freedom in a along the upright in an axial direction; and (b) a first degree of freedom of motion along the upright in an axial direction, while being inhibited from angular displacement in a second degree of freedom of motion in a circumferential direction about the upright. The connector body also has a cross-tie mount. The cross-tie mount has a rotational degree of freedom about an axis cross-wise to the axial direction of the pole.

In a feature of that aspect of the invention, the gripping array includes a plurality of sets of rings of outwardly extending protrusions, and the connector body defines a seat for engagement with at least a first of the sets. In another feature, the seat has abutment members that interact with the first of the sets. In still another feature, the connector has at least a first end face, and the cross-tie mount is offset to align with the first end face. In a further feature, the connector is a first connector, and the combination includes a second connector having the same features as the first connector, the second connector being inverted and mounted back-to-back with the first connector whereby the cross-tie mount of the first connector and the cross-tie mount of the second connector align.

In another feature, the combination includes a first connector and a second connector. The first connector has a first degree of freedom of angular displacement in a circumferential direction about the upright, while being inhibited from displacement in a second degree of freedom along the upright in an axial direction. The second connector has a first degree of freedom of motion along the upright in an axial direction, while being inhibited from angular displacement in a second degree of freedom of motion in a circumferential direction about the upright. In a further feature, the second connector is located above the first connector.

In another feature, the first connector has at least a first end face, and the cross-tie mount of the first connector is offset to align with the first end face of the first connector. The second connector has at least a first end face, and the cross-tie mount of the second connector is offset to align with the first end face of the second connector. The second connector is located on the upright above the first connector. In a further feature the second connector is inverted and the first end face of the second connector and the first end face of the first connector face toward each other. When seated in abutment the cross-tie mount of the second connector aligns with the cross-tie mount of the first connector.

In another aspect of the invention, there is a connector apparatus for mating to a substantially cylindrical elongate member, the elongate member having a grip surface or feature, that grip surface having a plurality of axially spaced index elements. The connector apparatus has a body seatable about the elongate cylindrical member, and has an index member for mating engagement with at least one of the index elements of the substantially cylindrical elongate element from amongst a plurality of positioning alternatives relative to the substantially cylindrical elongate member. When so engaged, the connector body is restrained in respect of a first degree of freedom relative to the elongate member, and is permitted a range of motion in respect of a second degree of freedom, the second degree of freedom being independent of, and generally perpendicular to, the first degree of freedom. The connector body has an arm or lug, or auxiliary mounting, however it may be termed, that may protrude away from the body. The auxiliary mounting has a degree of freedom that permits motion predominantly cross-wise to the permitted range of motion of the second degree of freedom of the body. The lug on the side of the connector body defines a securement fitting at which to connect other objects, be they elongate members, or exercise or other apparatus.

In a feature of that aspect, the connector apparatus may have the first degree of freedom of the connector body as axial displacement relative to said substantially cylindrical elongate member, and the second degree of freedom as circumferential motion about the substantially cylindrical elongate member. In a further feature, the auxiliary mounting may includes an axis of pivotal motion on a circumferential tangent relative to said substantially cylindrical elongate member.

In an alternate feature, the first degree of freedom of the connector body may be circumferential motion about the substantially cylindrical elongate member, and the second degree of freedom may be axial displacement relative to the substantially cylindrical elongate member. In a further feature, the auxiliary mounting fitting may have an axis of pivotal motion on a circumferential tangent relative to said substantially cylindrical elongate member. In another feature, the auxiliary mounting may have an axis of pivotal motion substantially parallel to said substantially cylindrical elongate member.

BRIEF DESCRIPTION OF THE ILLUSTRATIONS

These and other features and aspects of the invention may be explained and understood with the aid of the accompanying illustrations, in which:

FIG. 5b shows a cross-sectional view through the connector and support standard of FIG. 5a;

FIG. 6a shows an enlarged front view of a detail of the apparatus of FIG. 2 in a closed position;

FIG. 7a shows a disconnected detail of the apparatus of FIG. 6a;

FIG. 7b shows a partially sectioned, further enlarged, and rotated view of the detail of FIG. 7a;

FIG. 8a is perspective view of an alternate or additional embodiment of elements of a support apparatus such as that of FIG. 1 or FIG. 2;

FIG. 8b is an enlarged detail of the apparatus of FIG. 8a; and

DETAILED DESCRIPTION

Figure 1A:
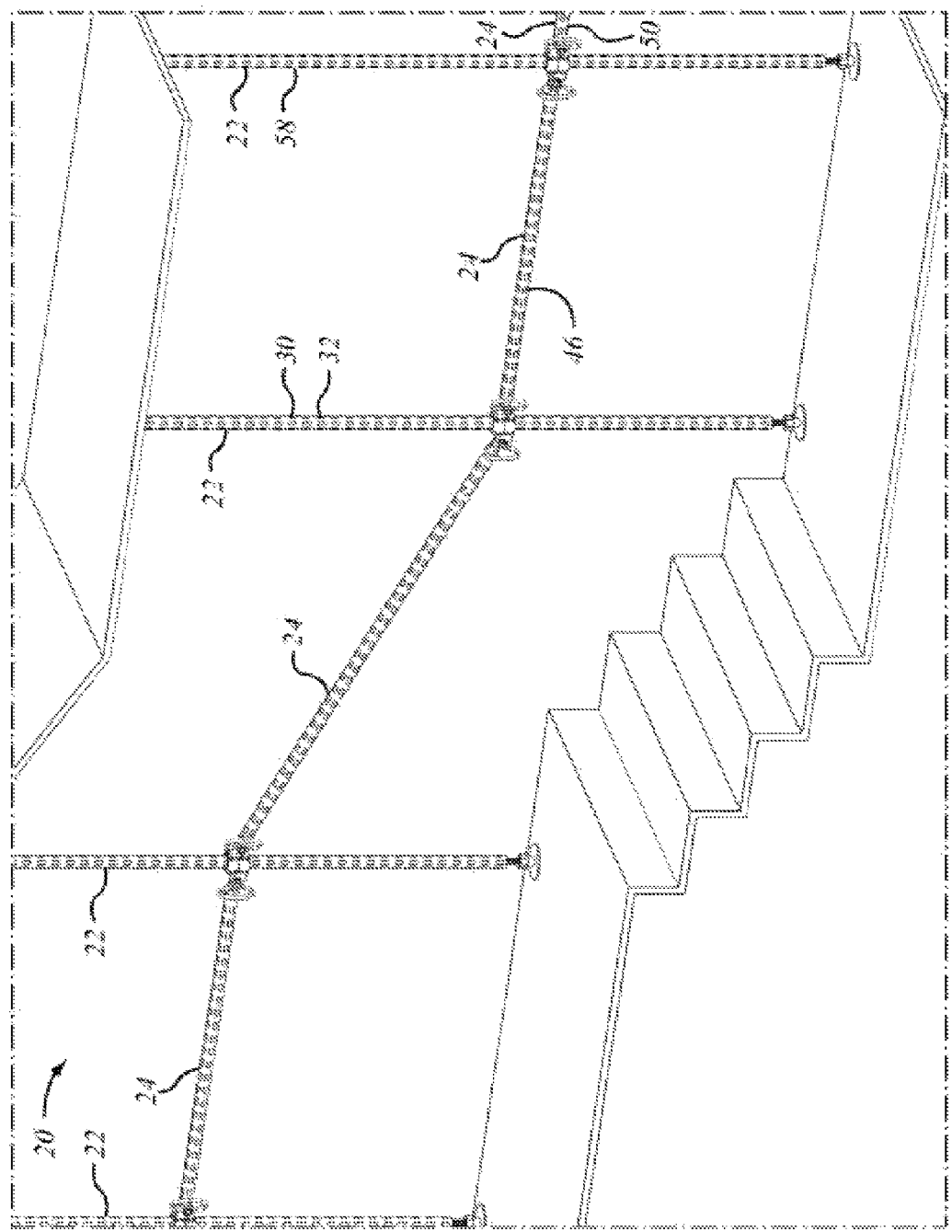
FIG. 1a is a perspective general arrangement view of a support apparatus such as may incorporate one or more aspects or features of the present invention.

The description that follows, and the embodiments described therein, are provided by way of illustration of an example, or examples, of particular embodiments incorporating one or more of the principles, aspects and features of the present invention. These examples are provided for the purposes of explanation, and not of limitation, of those principles, aspects and features of the invention. In the description, like parts are marked throughout the specification and the drawings with the same respective reference numerals. The drawings may be taken as being to scale, or generally proportionate, unless indicated otherwise.

The scope of the invention herein is defined by the claims. Though the claims are supported by the description, they are not limited to any particular example or embodiment, and any claim may encompass processes or apparatuses other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

The terminology used in this specification is thought to be consistent with the customary and ordinary meanings of those terms as they would be understood by a person of ordinary skill in the art in North America. The Applicants expressly exclude all interpretations that are inconsistent with this specification, and, in particular, expressly exclude any interpretation of the claims or the language used in this specification such as may be made in the USPTO, or in any other Patent Office, other than those interpretations for which express support can be demonstrated in this specification or in objective evidence of record, demonstrating how the terms are used and understood by persons of ordinary skill in the art, or by way of expert evidence of a person or persons of experience in the art.

A frame of reference may be helpful in understanding the description. In the case of a wall structure, or space-wise extending support structure, such as may be described herein, a Cartesian co-ordinate system may be applied on the assumption that rooms of buildings and dwelling have height and width and length. Not all walls are planar—walls can be curved or arched—and support structure may be used along outdoor pathways, which may be neither straight nor level. In the embodiments described, the z-axis or z-direction may be taken as being the height or heighth-wise direction of the eventual assembly as assembled and installed in a building, taking the floor or ground as a datum. In such installation the z-direction would most normally be a vertical axis. The y-direction may be taken as the horizontal direction running along the wall width-wise. The x-direction may be taken as the direction along the support structure, as being the predominant direction of travel. This co-ordinate system assumes that the support structure, or components thereof, is or are, viewed as finally installed. The terminology is nonetheless somewhat arbitrary.

In respect of the individual members of the support structure, the predominant members of the structure may be posts or ties. In either case the dominant dimension of the member is its length, and a local, cylindrical polar co-ordinate system may be used in which the x-direction (if predominantly lateral) or the z-direction (if predominantly vertical) defines the axial direction of the member, with the member having a corresponding radial direction, r, and a circumferential direction, usually indicated as theta.

The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than".

Referring to the general arrangement of FIG. 1a, there a structural assembly indicated generally as 20. Assembly 20 may include an array of structural members including an array of vertical, or predominantly vertical members, such as may be termed uprights, 22, and an array of lateral or predominantly laterally extending members 24 such as may extend between the vertical array members 22.

Figure 1B:
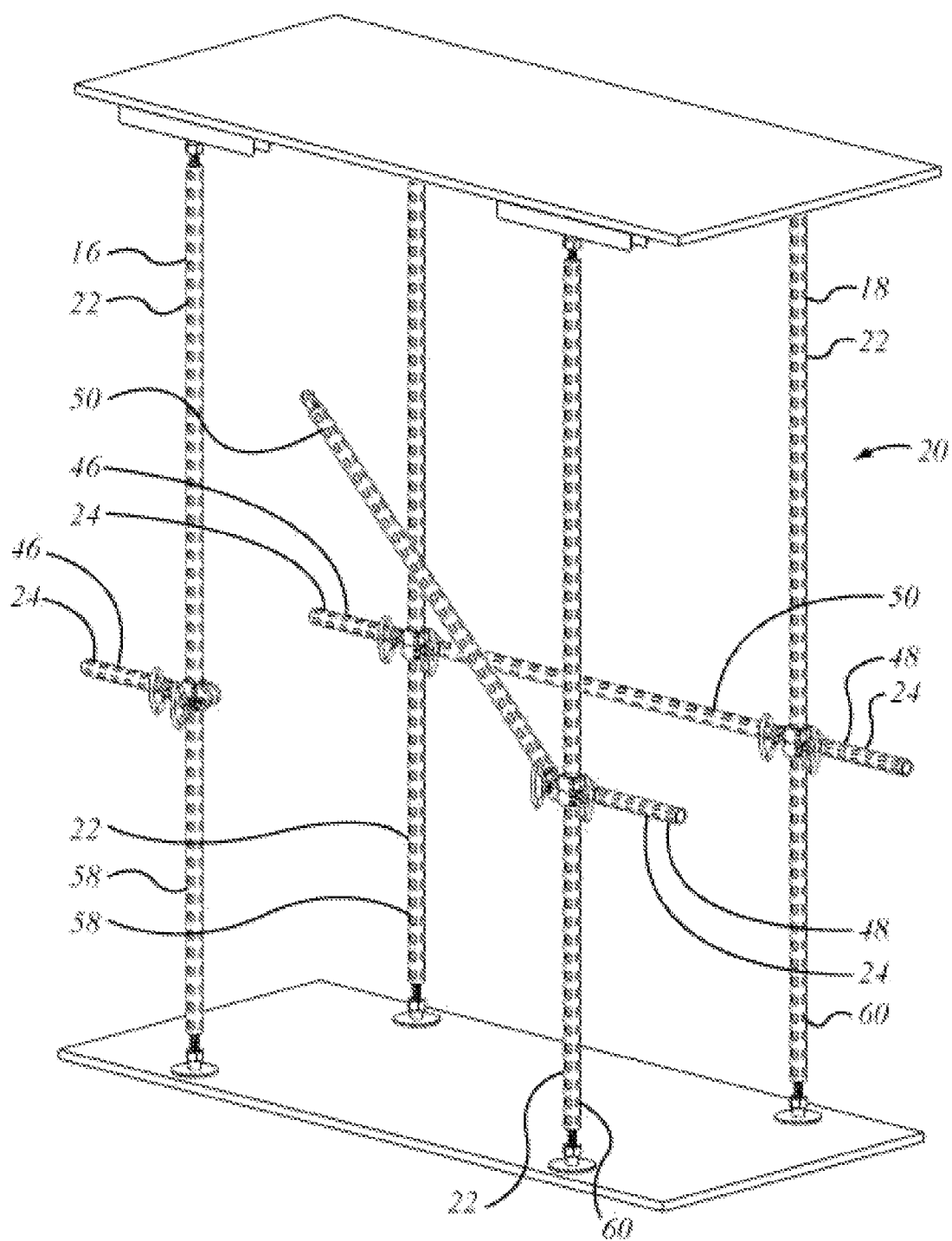
FIG. 1b is a perspective general arrangement view of a support apparatus similar to that of FIG. 1 arranged in a parallel-bars configuration.

Assembly 20 may be thought of as a set of elements defining a safety railing, or support railing, such as may be installed in a building or dwelling by which a person of inhibited mobility or vision may aid himself or herself to traverse the room or space, to stand up from or sit down in a chair, or bed; or to get to or from a washroom, for example. Alternatively, an apparatus, such as assembly 20 or similar, may be used as an exercise, physiotherapy, or rehabilitation apparatus. An alternate version of assembly 20, using common annotation numbers, is shown in FIG. 1b, in which there are left and right hand arrays, indicated generally as 16 and 18, that are mounted in a parallel arrangement. While handrails and banisters are known in dwellings and other buildings, the rigging of parallel support arrays tends to be problematic in many locations. That apparatus of items 16 and 18 may be installed on a temporary or semi-permanent basis with a spacing suitable for a person to grasp with either hand while walking.

Figure 2:
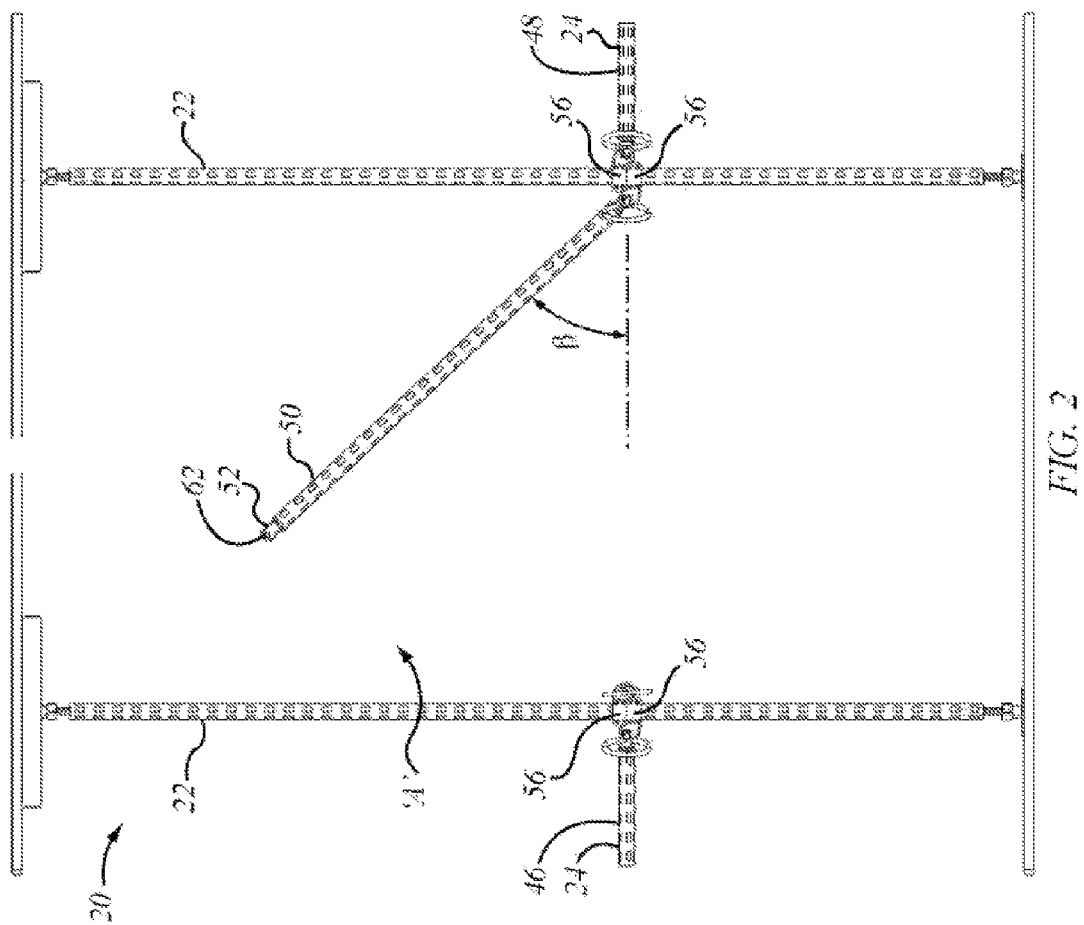
FIG. 2 is a side view of a portion of a support apparatus such as that of FIG. 1 with a gate in an at least partially raised open position.
Figure 3:
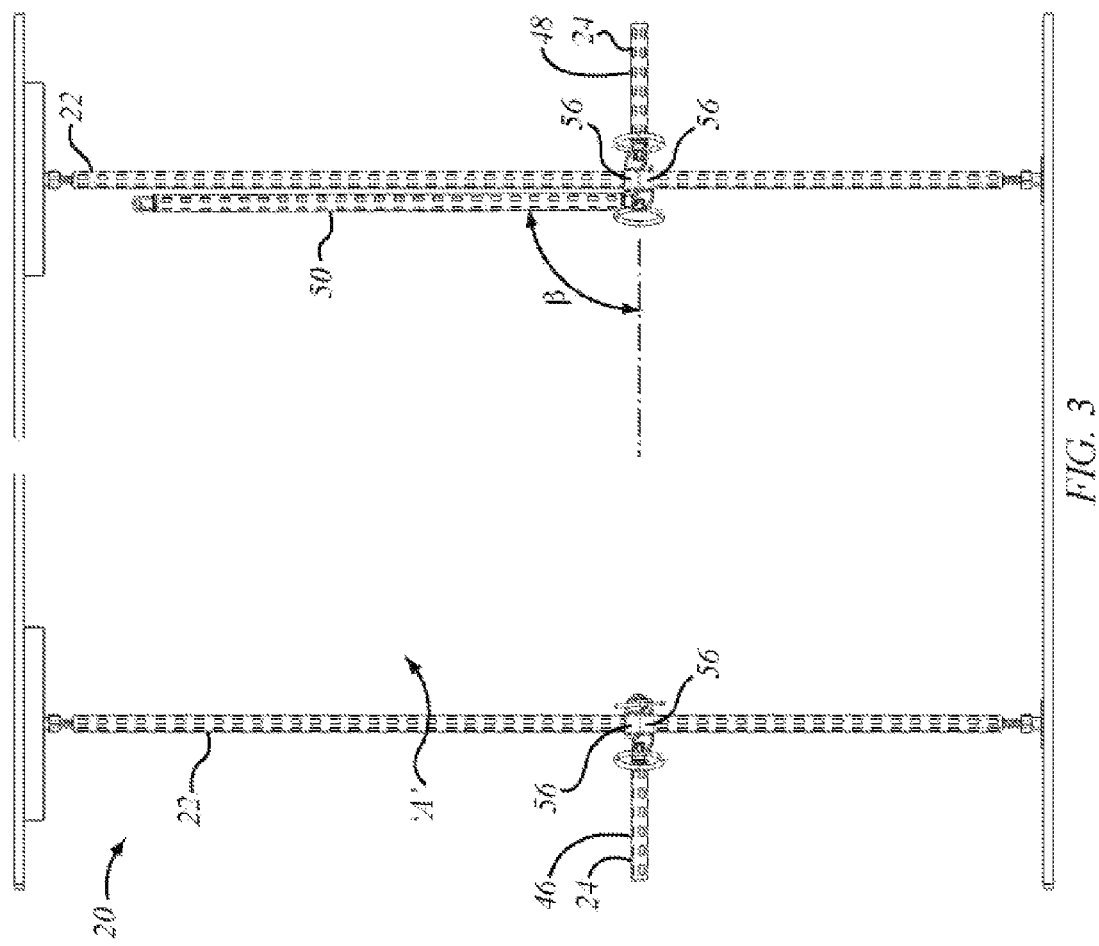
FIG. 3 is a side view of the support apparatus of FIG. 2 with the gate in a fully raised open position or condition.
Figure 4:
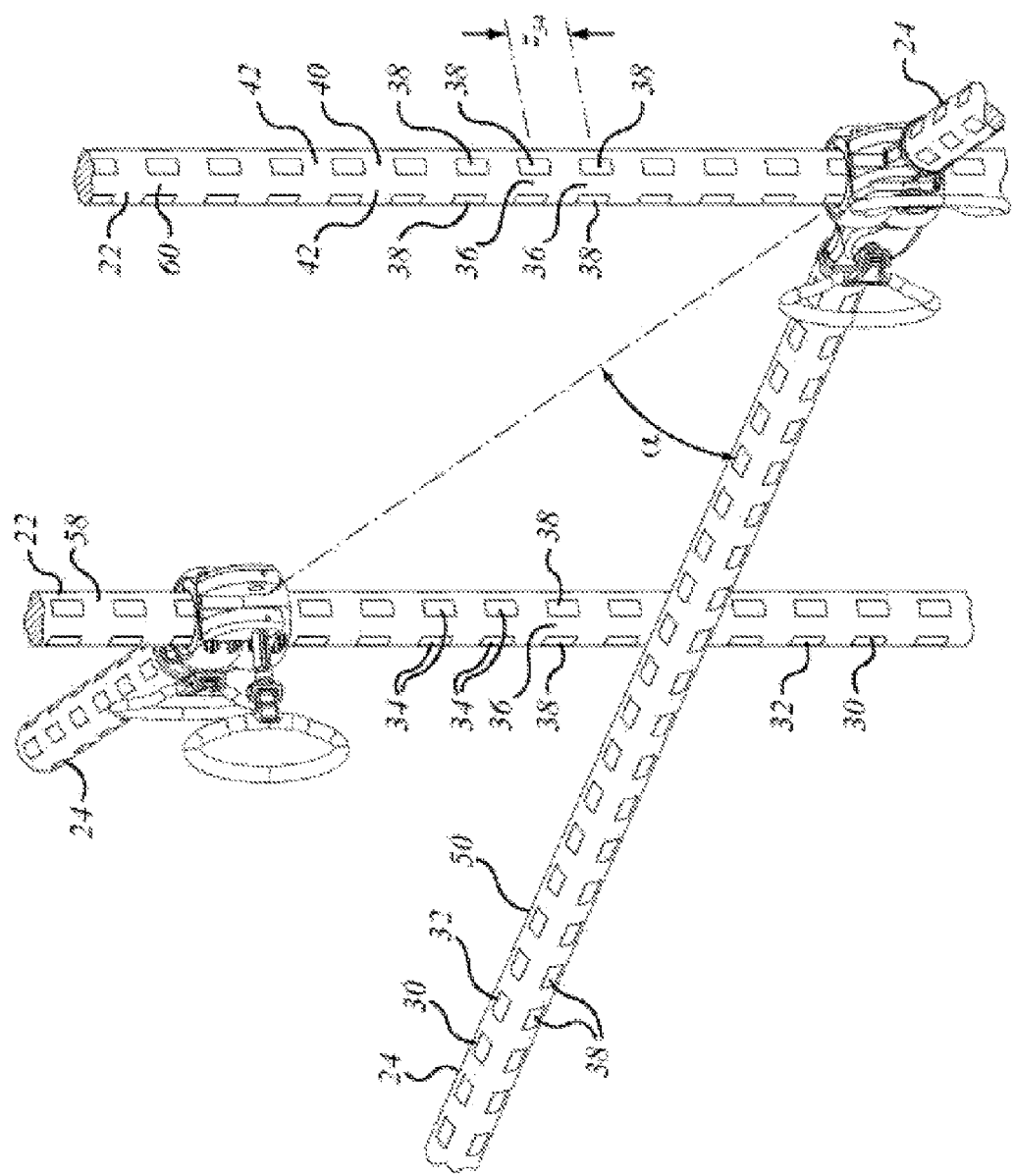
FIG. 4 is an enlarged view of the apparatus of FIG. 2 in a sideways swung-open position.

Uprights 22 may be called posts, or poles, or stanchions, or standards, as may be appropriate for predominantly vertically extending members, and may tend generally to be oriented up-and-down vertically, or substantially vertically. Uprights 22 may have a single moment-connected base such as may tend to resist deflection of the upper portion thereof at an upper free end. Alternatively, as illustrated in FIGS. 1 and 2, uprights 22 may have the form of struts or posts mounted between connections at floor and ceiling. Those connections may be moment connections, but may also be, or may approximate, pin-joint or ball joint connections. I.e., it may not necessarily be that those joints may transmit a bending moment. The vertical posts, or uprights, 22, may have the form of extensible posts, whether with spring-loaded extensions or threaded screw-jacks at either top or bottom, or both, with a pad or footing at either end for engaging a ceiling or a floor, and, when so engaged may put the strut in longitudinal compression between floor and ceiling, thereby establishing a friction connection between the foot or head of the pole. Alternatively the post may be screwed into the wall or floor, as may be. Whether by this means or another, the array of uprights may be established.

Each of uprights 22 may have an internal post 26 (FIG. 5b) such as may be round and cylindrical, an external grip feature, or assembly, or pattern, or tread, such as may be indicated as 30. The grip feature, however it may be called, may be wrapped, or formed, or molded, or otherwise mounted about internal post 26. In one embodiment the grip feature may be formed in a plastic sleeve that slips onto a metal post 26 and that is held in place with adhesive or epoxy. Alternatively, the grip feature could also be machined into the surface, whether plastic or metal. In each instance the grip feature is such as to present a non-smooth, bumpy or knobby surface 32, not unlike the tread of a tire, such as may be relatively easily grasped by the hand. The grip feature may be made of a metal, or of plastic or firm rubber or a rubber-like material, such as might be expected of a hand grip, and may have a non-slip texture or finish, as may be. The tread pattern may be such as to have protrusions, knobs or bumps or splines or lugs, however they may be called, 38, arranged in a succession of circumferentially extending groups 34, those groups being axially spaced from each other by some distance. While the spacing distance may not necessarily be constant, and may vary, in some embodiments it may be convenient for the spacing to be on a constant pitch, indicated as $z_{34}$. Knobs, lugs, or bumps 38 are shown in a simplified form in FIGS. 1-4, and 8a; and in a more detailed form in FIGS. 5a-7b, 8b, and 9.

In one embodiment each such group 34 may have a generally annular form standing generally radially outwardly of internal post 26. That generally annular form may be circumferentially relived or crenelated as at 36, i.e., so that there are gaps in the ring leaving a set of knobs or bumps 38, as noted above.

Intermediate adjacent groups 34 there may be an annular relief 40 in the form of a circumferentially extending trough or passage, or channel 42 running on a circumferential-direction arc. In the embodiment shown, channel 42 is unobstructed over the full circle of the circumferential arc. In some embodiments rather than having a radially inwardly formed passageway or channel, there may be a radially outwardly formed ring. Annular relief 40 in one context, or the alternating sets 34 of knobs or bumps, may be, or may perform the function of, an indexing fitting or indexing feature, or indexing member such as may present an at least partially, if not predominantly, radially extending flank, or shoulder, or abutment, or stop, however it may be called. It may also be termed a seat or accommodation. In the embodiment shown, the flank may be a series or set of surfaces defining the sides 44 of the knobs or bumps 38. That is to say, relief 40 may define a fitting that is at least one-way obstructive to motion in a first degree of freedom, in this instance the degree of freedom being axial motion along post 26; and at least one-way tolerant of motion in a second degree of freedom, in this instance the degree of freedom being rotational motion in the circumferential direction.

Predominantly laterally extending members 24 include cross-members, or struts, or rails or railings, or stringers, or laterally extending support members, or cross-ties, such as may be identified as items 46, 48, and 50. They may be all of the same length, or may be of differing lengths. It is not necessary that they be horizontal, or that they extend perpendicularly to the axis (or axes) of an adjacent post (or posts). As shown in FIG. 1, they may extend along a rising or falling pathway or staircase as a handrail. As is the nature of struts, each has a first end and a second end. Members such as items 46, 48, 50 may be mounted at their ends to adjacent uprights 22 at interface members 52, 54, such as may be termed connectors, 56. The structure of cross-ties 46, 48, 50 may be substantially similar. In keeping with the general purpose of being hand rails or supports for a person, they may include the same, or substantially similar, hand grip features as the vertical members, namely uprights 22, although this may not necessarily be so.

Whether considering handrails such as may be defined by members 46, 48, or 50; or uprights or posts defined by members 58 or 60, uprights 22 and predominantly laterally extending members 24 may generically be considered to be substantially cylindrical elongate members. Although the bumpy grip surface of knobs or bumps 38 is not cylindrical at the local level or scale of the bumps, (purposely not, given the gripping function), the section is repeating, such that all of the bumps fall within a cylindrical envelope along the length of the member. Overall, the members are predominantly cylindrical and the relationship of connectors 56 to members 22 and 24 is one of co-axial cylindrical mating that presumes a plurality of alternative positioning selections, whether axially or circumferentially, on the cylinder as explained in the context of the embodiments shown and described herein.

It may be desirable to open a passageway, notionally identified as 'A' between two adjacent uprights, such as items 58, 60 which bracket cross-tie 50 (expressed alternately, cross-tie 50 is intermediate, extends laterally between, uprights 58, 60). To that end, a user or attendant, or care-giver, may wish to displace cross-tie 50 from the initially transverse blocking, and connected-at-both-ends, condition shown in FIG. 1a, and also shown in assembly 18 in FIG. 1b to the one-side-released, partially swung upward condition of assembly 16 in FIG. 1b or apparatus 20 of FIG. 2 or to the fully upwardly pivoted condition of FIG. 3, or, alternately, to the side-ways swung door or gate position of FIG. 4.

End fittings 62, 64 of cross tie 50 (and of such of cross-ties 46, 48 as may be) matingly engage with associated respective mating fittings 66 of connectors 56, the interface connection between the engaging member 62, 64 and 66 permitting a degree of freedom of rotational pivoting motion of cross-tie 50 with respect to upright 60; and the interface of connector 56 permitting a second degree of freedom, in this instance rotational freedom in the circumferential direction about the long axis of upright 58 or 60.

Figure 5A:
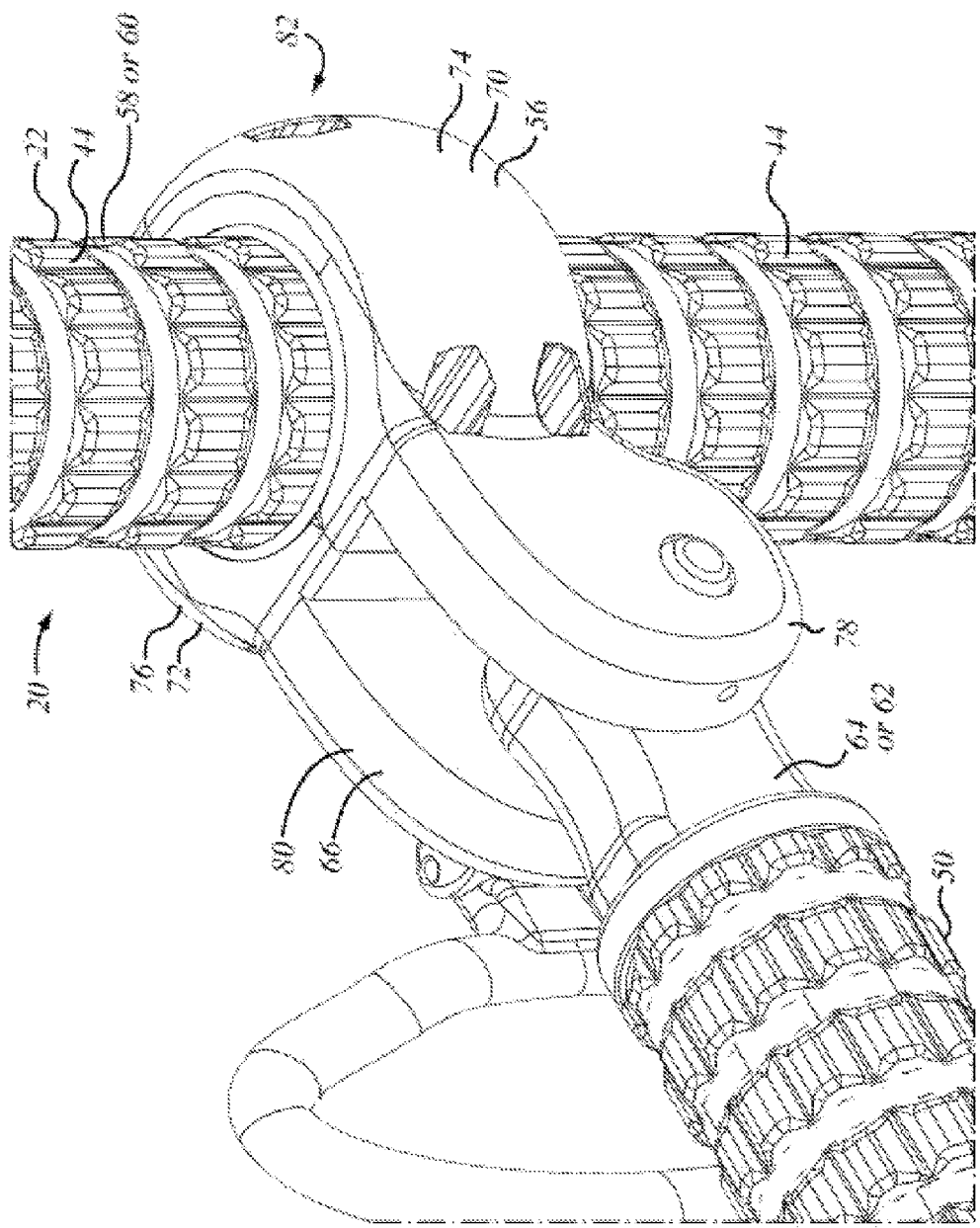
FIG. 5a is an enlarged detail of a single connector of the apparatus of FIG. 1 or FIG. 2 mounted on a support standard.
Figure 5B:
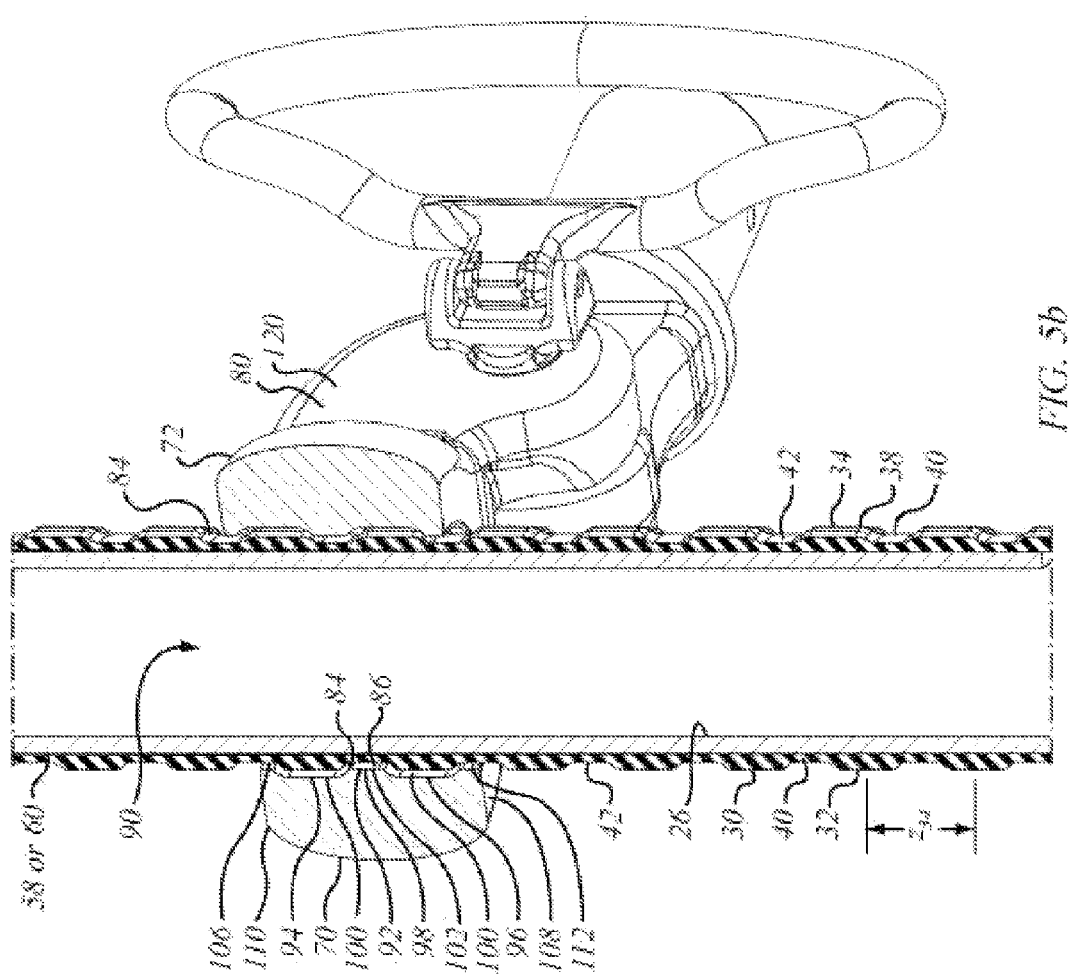

In the embodiment illustrated in FIGS. 5a and 5b, connector 56 has a body having first and second portions or halves, 70, 72. Halves 70, 72 need not be symmetrical, or mirror images of each other. However, they may be mirror images, whether predominantly or identically, as shown in the illustrated embodiment. To the extent that halves 70, 72 are opposite hand, a description of one may be taken as a description of the other, with due allowance for their handedness.

Each of halves 70, 72 has a first portion 74, 76, and a second portion 78, 80, respectively. First portion 74 defines a first portion of a surround, and second portion 76 defines a second, mating portion of a surround, the two normally being mated together to form a collar, and secured as by mounting hardware 82, which may be threaded fasteners in the nature of nuts and bolts, and such as may be adjustable with sockets or Allen keys or other suitable tools as may be. The surround formed thereby has, captured within it, upright 58 (or 60, as may be). Each of halves 70, 72 has a relief, or interface portion or half, or accommodation 84 formed therein for mating engagement with upright 58, 60. When halves 70, 72 are mated together, the interface portions 84 combine to form, or define, a full connector-to-post interface member, which may be termed a seat or collar 86 that extends about upright 58, 60 and prevents the escape thereof.

Taking halves 70, 72 as being mated together, the combined effect is to define a bore or passageway 90 therethrough admitting upright 58, 60. The wall 92 of passageway 90 so formed has a first, or upper, portion 94; a second, or lower, portion 96; and an intermediate or middle portion 98. In the embodiment shown, upper and lower portions 94, 96 have respective internal circumferentially extending annuli or channels 100 that are smooth-walled and that have sufficient clearance to permit a first degree of freedom, namely that of angular displacement in the circumferential direction, relative to bumps 38.

Middle portion 98 has a land or inwardly radially protruding portion 102. As installed, protruding portion 102 seats within the accommodation defined by channel 42. Protruding portion 102 has a radius of curvature that is smaller than the radially outermost extremity of bumps 38, and extends over a sufficient arc to span suchever of gaps or crenelations 36 as may be, such that portion 102 cannot pass the flank or side 44 of knobs 38 in the axial direction. As such, the side face, or radially inwardly extending face, whether perpendicular to the axis or sloped, or radiused, defines a stop or abutment, or engagement member, or indexing member or fitting or feature that interacts with the mating feature of grip feature 30 such as to inhibit motion in one degree of freedom, namely translation of connector 56 along the z-axis of upright 58 (or 60), while that same interaction interface permits at least a measure of motion in the degree of freedom of motion of connector 56, and therefore of cross-tie 50, in the circumferential direction relative to strut 58 (or 60).

In the embodiment of FIGS. 5a and 5b, the upper and lower regions or portions also have respective upper and lower end extremities 106, 108 adjacent upper and lower end faces 110, 112. In that embodiment upper and lower extremities 106, 108 also form toes on a smaller radius than the adjacent bumps 38. thus forming additional inhibitors or indexing members operable to limit axial motion of connector 56 and thereby to retain connector 56 at a selected height (i.e., axial position along) upright 58 or 60. Connector 56 may have both an intermediate indexing member, or end face indexing members, or both, as illustrated. The presence of an abutment, or motion blocking, relationship in the +z direction and the −z direction may be achieved either way, and is also achieved by having an outwardly protruding set of bumps 38 bracketed by upper and lower annular toes, as much as by having an inwardly protruding ring or shoulder, such as portion 102 that seats between, and is axially bracketed by, two adjacent sets of bumps 38. As such, connector 56 is provided with a large number of possible alternate height settings or alternate positions while using the extant grip features of uprights 58, 60, retaining that generality of flexibility without requiring additional fittings.

Second portion 78, 80 may include or define the cross-tie attachment interface or connection. In the example illustrated, each half may have a laterally protruding lug 120, 122, such that when halves 70, 72 are mated lugs 120, 122 combine to form first and second legs of a yoke or clevis 124. To the extent that the end fittings of the cross tie define a lug or hard-eye, insertion of a pin such as pin connector 126 through clevis 124 and the end fitting creates a double shear connection between the parts.

Figure 6B:
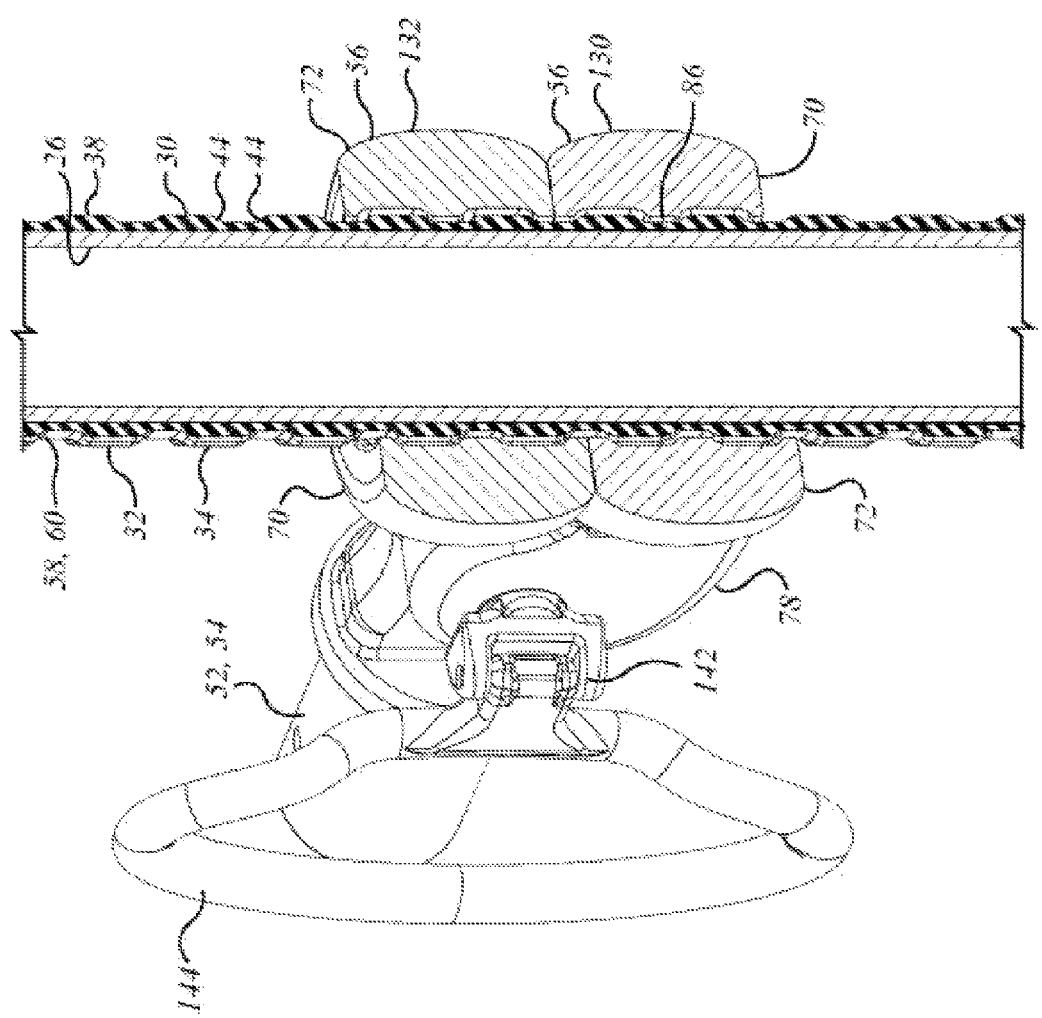
FIG. 6b is a perspective view of the apparatus of FIG. 6a in section.
Figure 7A:
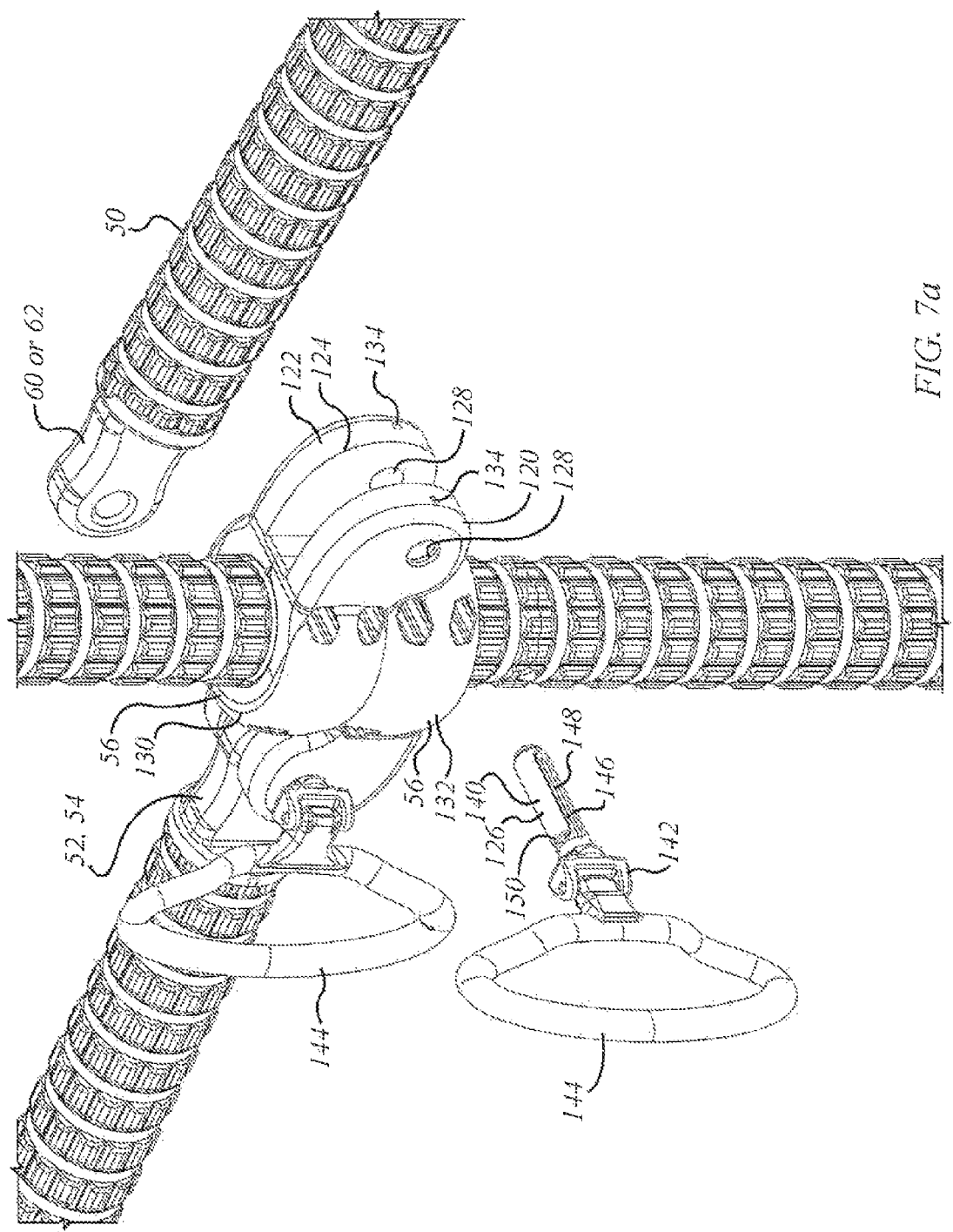

In the embodiment shown in FIGS. 5a and 5b, the lug, or clevis, is not symmetrical about the horizontal central plane of first portion 70, 72, but rather is offset, having a curved or dog-legged form. In the embodiment shown, the centerline of the bore or eye 128 of clevis 124, and thus also the centerline of pin connector 126, is set to lie in the same, or substantially the same, horizontal plane as lower end face 112. The effect of this offset is seen in FIG. 6a, in which a first connector 56 (identified as 130) is mounted back-to-back with a second connector 56 (identified as 132) that has been inverted such that their respective connector pins 126 lie in the same plane, and the respective cross-ties 48, 50 are carried at the same height.

Each of lugs 120, 122 may have a cross-bore 134 that intersects the respective eye 128. Cross-bore 134 may intersect the bore or eye 128 on a diametral plane. A roll pin, or cotter pin, or dog 136 may be inserted in near-side cross-bore 134 with its inward end standing radially inwardly proud of the wall of eye 128.

Pin connector 126 may be part of an assembly that include the pin itself, indicated as 140, a head 142, and a tether, or tie, or grip or handle 144. Pin 140 may be cylindrical in section, and may have an axially extending relief, or groove, flute or slot 146. The distal end of slot 146 near the tip of pin 140 may be blind, i.e., not open, such as to form an entrapment or stop. Near the juncture of pin 140 with head 142, the axial run 148 of slot 146 may terminate at a corner, and slot 146 may continue on a circumferential path or arc portion 150 that extends partially around the outside of pin 140, be it a quarter-turn or a half-turn. On installation, the tip of pin 140 is inserted into the near lug of clevis 124, axial run 148 of slot 146 aligned with bore 134. Dog 136 is then inserted into bore 134, engaging slot 146. Since both ends of slot 146 are closed, pin connector 126 can slide axially in and out to permit connection or disconnection of the end fitting of cross-tie 50, but cannot escape. When pin 140 is pushed all the way in, and given a quarter turn, it is locked axially, such as may prevent accidental release of cross-tie 50. Other alternative embodiments of retention features, and of slot 146 may be employed. For example, in one alternate example slot 146 may have the form of an helical thread or worm.

Handle 144 may have the form of a relatively large ring or loop to facilitate grasping with a hand. Handle 144 may also be pivotally mounted such as to permit handle 144 to be pulled in tension in alignment with the direction of pin 140 when it is desired to release cross-tie 50, and foldable to lie generally flat, or parallel to cross-tie 50 when not in use. As may be understood, the apparatus so described defines a releasable connection interface that, when connected, constrains motion of the cross-tie to angular motion about the axis of pin 140, permitting cross-tie 50 to swing up and down, like a counter or a crossing barrier. The rotational degree of freedom of connector 56 about the axis of upright 58 (or 60) permits cross-tie 50 to be oriented on installation, and also permits cross-tie 50 to swing laterally, in the manner of a gate or door as in FIG. 4. As may be understood, connector 56 does not transmit a bending moment, or a torque, such as might tend to twist upright 58 or 60. Where two such connectors 56 are released, one at either end of cross-tie 50, the cross-tie may be installed or removed.

Figure 8B:
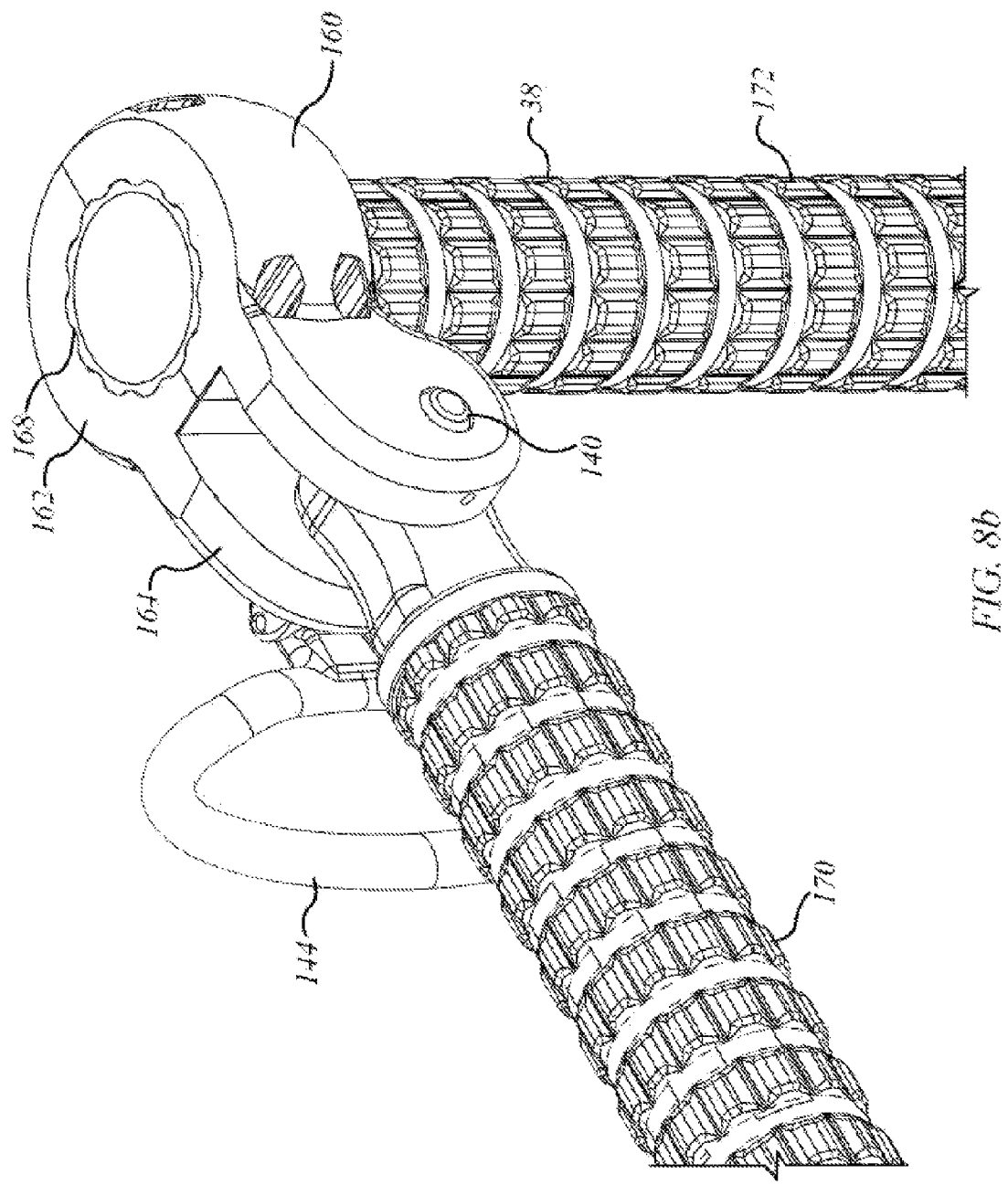
Figure 9:
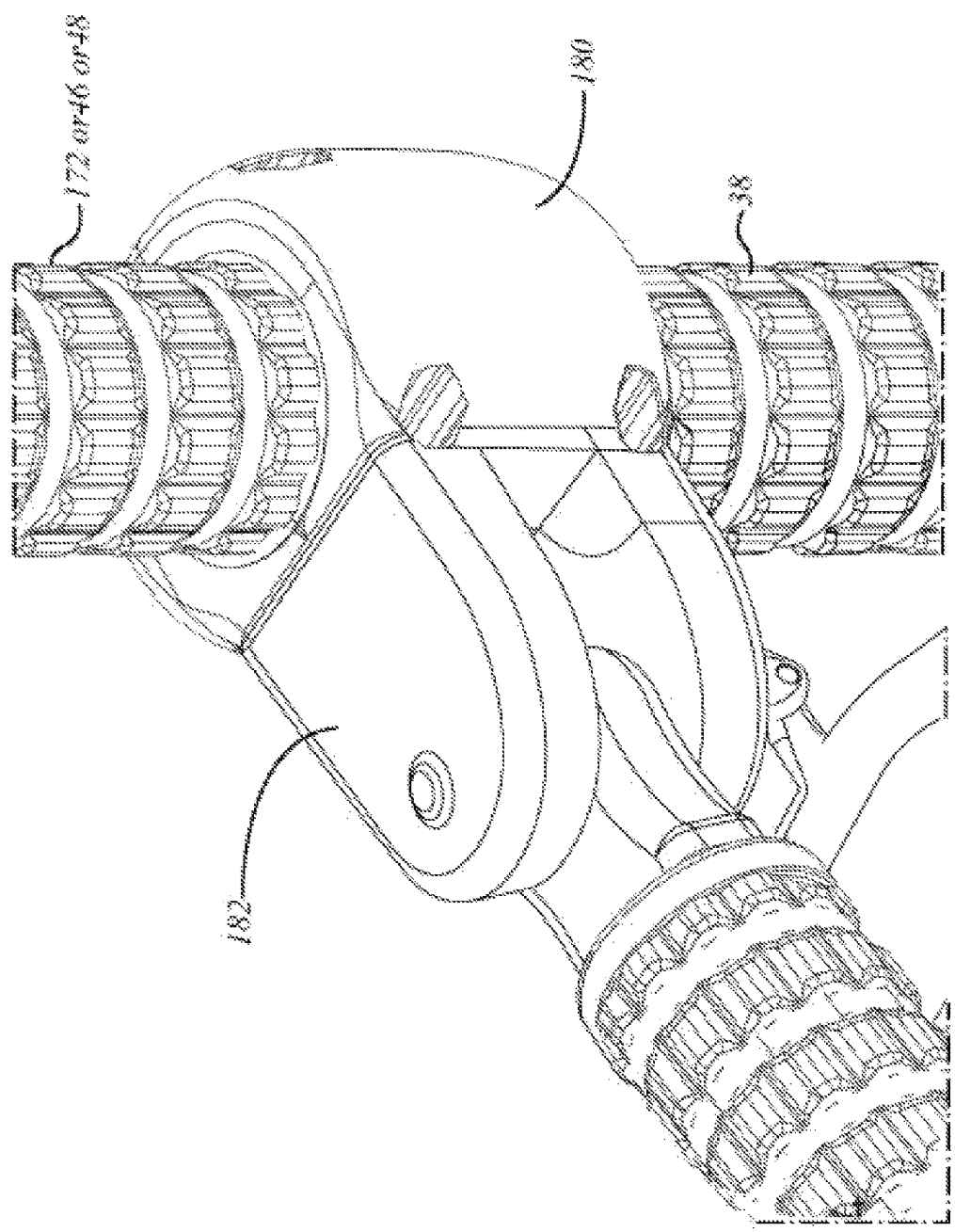
FIG. 9 shows an alternate configuration of connector to that of FIG. 8a with a lug having an axis of rotation oriented cross-wise thereto.

In the alternate embodiment of FIGS. 8a and 8b, there is a connector 160 which differs from connector 56 be having a bore profile that permits motion in a first degree of freedom, namely axial motion along upright 58 or 60, but inhibits motion in another degree of freedom, namely circumferential rotation or pivoting about upright 58 or 60, as may be.

To that end, connector 160 may have first and second portions 162, 164, respectively, where second portion 164 may be substantially the same as second potions 78, 80 as previously described. First portion is substantially the same as first portions 74, 76, but rather than having a circumferentially oriented indexing member, first portion 162 has a axially oriented grooves or splines 168 that define an axially oriented indexing member, or members, that pass through the spaces or crenelations between knobs 38, and which are greater in length axially than the vertical pitch spacing of successive sets of knobs, thereby permitting motion in the degree of freedom of axial translation, but inhibiting motion in the circumferential degree of freedom of rotational motion. To the extent that connector 160 can be repositioned axially along a post or pole, such as upright 58 or 60, it may be considered to be an axially displaceable shuttle.

It may be, as suggested by FIG. 8a, that connectors 160 may be attached at opposite ends of cross-tie 170, thus permitting cross-tie 170 to move up and down on uprights 172 at both ends thereof (second end not shown) as a sill. Uprights 172 may be the same as uprights 58, 60. It may further be that the adjacent connectors 56, linking to cross-ties 46, 48, are also mounted to uprights 172, 174, and define stops, or abutments, or seats upon which connectors 160 of cross-tie 170 are supported in the at-rest, undisplaced condition. Of course, either end of cross-tie 170 may still be released by moving pin 140 to the release position, allowing either vertically pivoting motion of cross-tie 170, or, if both are released, removal or installation.

There may be other stops that do not necessarily need to be connectors 56 which may limit the axial range of travel of connector 160. For example, a connector that has no freedom of motion in any degree of freedom, such as a clamp, or such as connection 100 shown in FIG. 4 of U.S. Pat. No. 5,506,753, could be used as a fixed member defining a limit on axial range of motion of connector 160.

Alternatively, connector 160 may be applied to a lateral stay, such as 46, 48 or 50 extending between uprights such as 58 and 60, the term lateral not necessarily meaning horizontal, but rather as may correspond generally to the pathway to which apparatus 20 is adjacent. In such employment connector 160 may again be considered to be a shuttle, such as may, in one embodiment, conveniently be held in the hand of a person being guided along the path, or such as may be useful for holding while moving in a reciprocating manner during an exercise or other activity. In such reciprocating activity it may be desired to have a cross-member running laterally, as for example between structures 16 and 18 noted above. Alternatively a handle or ring or other exercise apparatus could be mounted to the shuttle, as at lug 162, for that motion in translation or reciprocation.

In an alternate embodiment, the axis of pivotal motion of lug 120 need not necessarily be oriented in the circumferential direction. For example, in the embodiment of FIG. 9, a connector 180, which may in other respects be taken as being similar to connector 160, may have a lug 182 having an axis of pivotal rotation parallel to the axis of the longitudinal support structure member to permit angular motion in a degree of freedom that is turned a quarter turn from that of connector 160 (and 56) such as to permit a member such as item 50 to sweep out a circumferential sector or arc. This orientation may be convenient for use with an axially movable shuttle whether on a predominantly upright pole or on a predominantly lateral handrail, such that the motion of the shuttle provided one degree of freedom of motion (i.e., axial translation) while being restrained in respect of rotation, while the lug provides a second degree of freedom of motion, such as swinging motion, in a different direction, in this case swinging motion cross-wise to the long axis of the support. This may be convenient, for example, where connector 180 is a predominantly horizontally translating or reciprocating shuttle, and it is desired to fasten an exercise or physiotherapy or rehabilitation apparatus to lug 182.

At a level of greater generality, in each of the embodiments there is a connector apparatus (be it 20, 160, 180) for mating to a substantially cylindrical elongate member (be it 46, 48, 50, 58, 60), the elongate member having a grip surface or feature (such as 30), that grip surface having a plurality of axially spaced index elements (e.g., groups or sets 34 of bumps 38). The connector apparatus has a body seatable about the elongate cylindrical member, and has an index member (86, or such parts thereof as may be) for mating engagement with at least one of the index elements of the substantially cylindrical elongate element from amongst a plurality of positioning alternatives relative to the substantially cylindrical elongate member. When so engaged, the connector body is restrained in respect of a first degree of freedom relative to the elongate member, and is permitted a range of motion in respect of a second degree of freedom, the second degree of freedom being independent of, and generally perpendicular to, the first degree of freedom. The connector body has an arm or lug, or auxiliary mounting that protrudes away from the body. The auxiliary mounting has a degree of freedom that permits motion predominantly cross-wise to the permitted range of motion of the second degree of freedom of the body. The lug on the side of the connector body defines a securement fitting at which to connect other objects, be they elongate members such as member 50, or exercise or other apparatus.

In the embodiment, the connector apparatus may have either (a) the first degree of freedom of the connector body as axial displacement relative to said substantially cylindrical elongate member, and the second degree of freedom as circumferential motion about the substantially cylindrical elongate member, as in connector 56. In that embodiment the auxiliary mounting may includes an axis of pivotal motion on a circumferential tangent relative to said substantially cylindrical elongate member.

Alternatively, the first degree of freedom of the connector body may be circumferential motion about the substantially cylindrical elongate member, and the second degree of freedom may be axial displacement relative to the substantially cylindrical elongate member as in connector 160 (or 180). In that embodiment the auxiliary mounting fitting may have an axis of pivotal motion on a circumferential tangent relative to said substantially cylindrical elongate member. In that embodiment, the auxiliary mounting may have an axis of pivotal motion substantially parallel to said substantially cylindrical elongate member.

What has been described above has been intended illustrative and non-limiting and it will be understood by persons skilled in the art that other variances and modifications may be made without departing from the scope of the disclosure as defined in the claims appended hereto. Various embodiments of the invention have been described in detail. Since changes in and or additions to the above-described best mode may be made without departing from the nature, spirit or scope of the invention, the invention is not to be limited to those details but only by the appended claims.

We claim:

1. The combination of an upright having a gripping array and a cross-tie member connector, wherein:

said gripping array has members thereof defining a plurality of indexing members spaced axially therealong;

said connector has a body selectively seatable about said upright, said body having an indexing member co-operably engageable with at least one of said plurality of indexing members of said gripping array of said upright; and when so co-operably engaged, said connector body having one of (a) a first degree of freedom permitting angular displacement in a circumferential direction about said upright, while being inhibited from displacement in a second degree of freedom along said upright in an axial direction; and (b) a first degree of freedom permitting motion along said upright in an axial direction, while being inhibited from angular displacement in a second degree of freedom of motion in a circumferential direction about said upright;

said connector body also having a cross-tie mount having a rotational degree of freedom about an axis cross-wise to the axial direction of said upright.

2. The combination of claim 1 wherein said gripping array includes a plurality of sets of rings of outwardly extending protrusions, and said connector body defines a seat for engagement with at least a first of said sets.

3. The combination of claim 2 wherein said seat has abutment members that interact with said first of said sets.

4. The combination of claim 1 wherein said connector has at least a first end face, and said cross-tie mount is offset to align with said first end face.

5. The combination of claim 4 wherein said connector is a first connector, and said combination includes a second connector having the same features as the first connector, said second connector being inverted and mounted back-to-back with said first connector whereby said cross-tie mount of said first connector and said cross-tie mount of said second connector align.

6. The combination of claim 1 wherein said connector is a first said connector, and said combination includes a second said connector;

said first connector has a first degree of freedom permitting angular displacement in a circumferential direction about said upright, while being inhibited from displacement in a second degree of freedom along said upright in an axial direction; and said second connector has a first degree of freedom permitting motion along said upright in an axial direction, while being inhibited from angular displacement in a second degree of freedom of motion in a circumferential direction about said upright.

7. The combination of claim 6 wherein said second connector is located above said first connector.

8. The combination of claim 6 wherein:

said first connector has at least a first end face, and said cross-tie mount of said first connector is offset to align with said first end face of said first connector;

said second connector has at least a first end face, and said cross-tie mount of said second connector is offset to align with said first end face of said second connector; and said second connector is located on said upright above said first connector.

9. The combination of claim 8 wherein said second connector is inverted and said first end face of said second connector and said first end face of said first connector face toward each other, and, when seated in abutment said cross-tie mount of said second connector aligns with said cross-tie mount of said first connector.

10. The combination of claim 1 wherein said indexing member of said connector body matingly engages at least one of the indexing members of the upright, and, when so engaged, said body being axially retained along the upright and being circumferentially movable about the upright.

11. The combination of claim 1 wherein the gripping array has radially outwardly extending protrusions, and said indexing member of said body is a radially inwardly protruding member.

12. The combination of claim 1 wherein said body has a first annulus defined therein, said annulus providing a clearance space for said indexing members of said gripping array of said upright whereby to permit circumferential motion of said body about said upright.

13. The combination of claim 1 wherein said body has a first portion and a second portion, said first portion and said second portion being separable to permit installation on the upright, and securable together on installation.

14. The combination of claim 1 wherein said cross-tie mount includes one of: (a) a clevis for mating engagement with a tongue of a cross-tie; and (b) a tongue for mating engagement with a clevis of a cross-tie.

15. The combination of claim 1 wherein said body of said connector has at least a first end face extending cross-wise to the upright, and said cross-tie mount has an axis of said rotational degree of freedom thereof offset toward said first end face.

16. The combination of claim 1 wherein said connector is a first said connector, and said combination includes a second said connector, said second connector being placed in inverted orientation relative to said first connector, and placed adjacent thereto, and, when so placed, said axes of rotational degrees of freedom of their respective cross-tie mounts are offset toward each other at corresponding heights relative to the upright.

17. The combination of claim 1, wherein:
said gripping array includes a first set of radially outwardly protruding members and a second set of radially protruding members;

said first set of radially outwardly protruding members is axially spaced from said radially outwardly protruding members;

said body has a first internal annulus sized to accommodate said first set of radially outwardly protruding members, whereby to permit circumferential motion of said body about said first set of radially outwardly protruding members; and said indexing member of said body being a radially inwardly extending member, said radially inwardly extending member being inhibited from passing said first set of radially outwardly protruding members of said gripping array.

18. The combination of claim 17 wherein said body has a second internal annulus sized to accommodate said second set of radially outwardly protruding members of said gripping array; and said radially inwardly extending member seats axially between said first and second sets of radially outwardly protruding members of said gripping array.

19. The combination of claim 1 wherein cross-tie mount has a degree of freedom permitting motion predominantly cross-wise to the permitted range of motion of the second degree of freedom of the body and also having a rotational degree of freedom about an axis cross-wise to the axial direction of said upright.

20. The combination of claim 1 wherein said connector apparatus includes a securement fitting by which to connect objects at said cross-tie mount.

21. The combination of claim 1 wherein said cross-tie mount has an axis of pivotal motion on a circumferential tangent relative to said upright.

22. The combination of claim 1 wherein said connector body is a connector body according to branch (b) of claim 1, and said cross-tie mount has an axis of pivotal motion substantially parallel to said upright.

* * * * *